United States Patent
Ohmura (10) Patent No.: US 9,434,335 B2
(45) Date of Patent: Sep. 6, 2016

(54) VEHICLE FRONT STRUCTURE

(71) Applicant: Toyota Jidosha Kabushiki Kaisha, Toyota-shi, Aichi-ken (JP)

(72) Inventor: Yukito Ohmura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/512,744

(22) Filed: Oct. 13, 2014

(65) Prior Publication Data
US 2015/0101877 A1    Apr. 16, 2015

(30) Foreign Application Priority Data
Oct. 15, 2013   (JP) .................. 2013-214946

(51) Int. Cl.
*B60R 21/00* (2006.01)
*B60R 21/206* (2011.01)

(52) U.S. Cl.
CPC ............ *B60R 21/00* (2013.01); *B60R 21/206* (2013.01); *B60R 2021/0009* (2013.01)

(58) Field of Classification Search
CPC ... B60R 21/00; B60R 21/205; B60R 21/206; B60R 2021/0009; B62D 21/15; B62D 21/152
USPC ................. 180/274, 271; 280/727
See application file for complete search history.

(56) References Cited

U.S. PATENT DOCUMENTS 6,095,273 A * 8/2000 Aboud et al. ............... 180/90

FOREIGN PATENT DOCUMENTS

| DE | 10154026 A1 * | 5/2003 | ........... B60R 21/16 |
| EP | 1010586 A2 | 6/2000 | |
| JP | 2005119537 A | 5/2005 | |
| JP | 2008-195261 A | 8/2008 | |
| JP | 2011068313 A | 4/2011 | |
| WO | WO 2014015094 A2 * | 1/2014 | |

* cited by examiner

*Primary Examiner* — Keith Frisby
(74) *Attorney, Agent, or Firm* — Dinsmore & Shohl LLP (57) ABSTRACT

A dash panel is provided with an air bag of an air bag device in a part facing a space between a front wheel and a front side member. The air bag is configured such that, when gas flows into the air bag from an inflator via a gas passage pipe at the time of a front end collision, the air bag is expanded and deployed between a rear part of the front wheel and the front side member.

5 Claims, 7 Drawing Sheets

VEHICLE FRONT STRUCTURE

INCORPORATION BY REFERENCE

The disclosure of Japanese Patent Application No. 2013-214946 filed on Oct. 15, 2013 including the specification, drawings and abstract is incorporated herein by reference in its entirety.

BACKGROUND OF THE INVENTION

1. Field of the Invention

The present invention relates to a vehicle front structure.

2. Description of Related Art

As for a vehicle front portion, there has been known a structure in which an impact is absorbed at the time of an offset collision of a vehicle (see, for example, Japanese Patent Application Publication No. 2008-195261 (JP 2008-195261 A), Japanese Patent Application Publication No. 2011-068313 (JP 2011-068313 A), Japanese Patent Application Publication No. 2005-119537 (JP 2005-119537 A)). For example, in JP 2008-195261 A, air bags are provided in respective facing portions of a bumper reinforcement and a side sill with respect to a front wheel, and the air bags are activated at the time of an offset collision of a vehicle, so that an input load in the collision is efficiently transmitted to a vehicle rear side.

However, there is room for improvement from a viewpoint of restraining a movement stroke of the front wheel when a load is applied to the front wheel diagonally rearward toward an inner side in a vehicle width direction.

SUMMARY OF THE INVENTION

The present invention provides a vehicle front structure that is able to restrain a movement stroke of a front wheel when a load is applied to the front wheel diagonally rearward toward an inner side in a vehicle width direction.

A vehicle front structure according to one aspect of the present invention includes: a front side member provided in a side part of a vehicle-body front portion, the front side member extending along a vehicle front-rear direction, the front side member being placed on an inner side relative to a front wheel in a vehicle width direction; and an air bag device including an air bag provided in a part facing a space between the front wheel and the front side member, the air bag being expanded and deployed between the front wheel and the front side member when gas flows into the air bag.

According to the above configuration, the front side member is placed on the inner side relative to the front wheel in the vehicle width direction, and the air bag of the air bag device is provided in the part facing the space between the front wheel and the front side member. When gas flows into the air bag of the air bag device, the air bag is expanded and deployed between the front wheel and the front side member. Accordingly, when the air bag is expanded and deployed at the time of a front end collision, even if the front wheel is going to move diagonally rearward toward the inner side in the vehicle width direction due to a collision load, the front wheel is supported by the air bag that receives a reaction force from the front side member. This accordingly restrains the movement of the front wheel toward the inner side in the vehicle width direction.

As described above, the vehicle front structure achieves such an excellent effect of restraining a movement stroke of the front wheel when a load is applied to the front wheel diagonally rearward toward the inner side in the vehicle width direction.

In the vehicle front structure, the air bag may be provided in a dash panel, the dash panel dividing the vehicle-body front portion from a cabin.

In the vehicle front structure, the air bag may be provided in the front side member.

According to the above configuration, since the air bag is provided in the front side member, it is possible to easily cause the air bag to intervene between the front wheel and the front side member.

The vehicle front structure achieves such an excellent effect that the air bag can be caused to intervene between the front wheel and the front side member in a short time.

In the vehicle front structure, a shock absorber may be placed between the front wheel and the front side member, the shock absorber being part of a suspension; and the air bag may be expanded and deployed between the shock absorber and the front side member when gas flows into the air bag.

According to the above configuration, when gas flows into the air bag, the air bag is expanded and deployed between the shock absorber and the front side member. Accordingly, when the air bag is expanded and deployed at the time of a front end collision, even if the shock absorber and the front wheel are going to move diagonally rearward toward the inner side in the vehicle width direction due to a collision load, the shock absorber is supported by the air bag that receives a reaction force from the front side member. This accordingly restrains the movement of the shock absorber and the front wheel toward the inner side in the vehicle width direction.

The vehicle front structure achieves such an excellent effect that it is possible to effectively restrain the movement stroke of the front wheel toward the inner side in the vehicle width direction by holding the shock absorber from the inner side in the vehicle width direction.

In the vehicle front structure, a suspension arm may be placed on the inner side relative to the front wheel in the vehicle width direction and on an outer side relative to the front side member in the vehicle width direction, the suspension arm being part of the suspension; and the air bag may be provided on a vehicle rear side relative to the suspension arm, the air bag being expanded and deployed toward the suspension arm when gas flows in the air bag.

According to the above configuration, the air bag is provided on the vehicle rear side relative to the suspension arm, the air bag is expanded and deployed toward the suspension arm when gas flows in the air bag. Accordingly, when the air bag is expanded and deployed at the time of a front end collision, even if the suspension arm is going to rotate around an inner end (a vehicle-body-side attachment portion) thereof in the vehicle width direction as a rotation center due to a collision load, the suspension arm is supported by the air bag that receives a reaction force from the front side member. This accordingly restrains a rotational movement of the suspension arm, thereby restraining the movement of the front wheel toward the inner side in the vehicle width direction.

The vehicle front structure achieves such an excellent effect that it is possible to effectively restrain the movement stroke of the front wheel toward the inner side in the vehicle width direction by supporting the suspension arm from the vehicle rear side.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

[First Embodiment] The following describes a vehicle front structure according to a first embodiment of the present invention with reference to FIGS. 1 to 4. Note that an arrow FR shown appropriately in each figure indicates a vehicle front side, an arrow UP indicates a vehicle upper side, and an arrow OUT indicates an outer side in a vehicle width direction.

Figure 1:
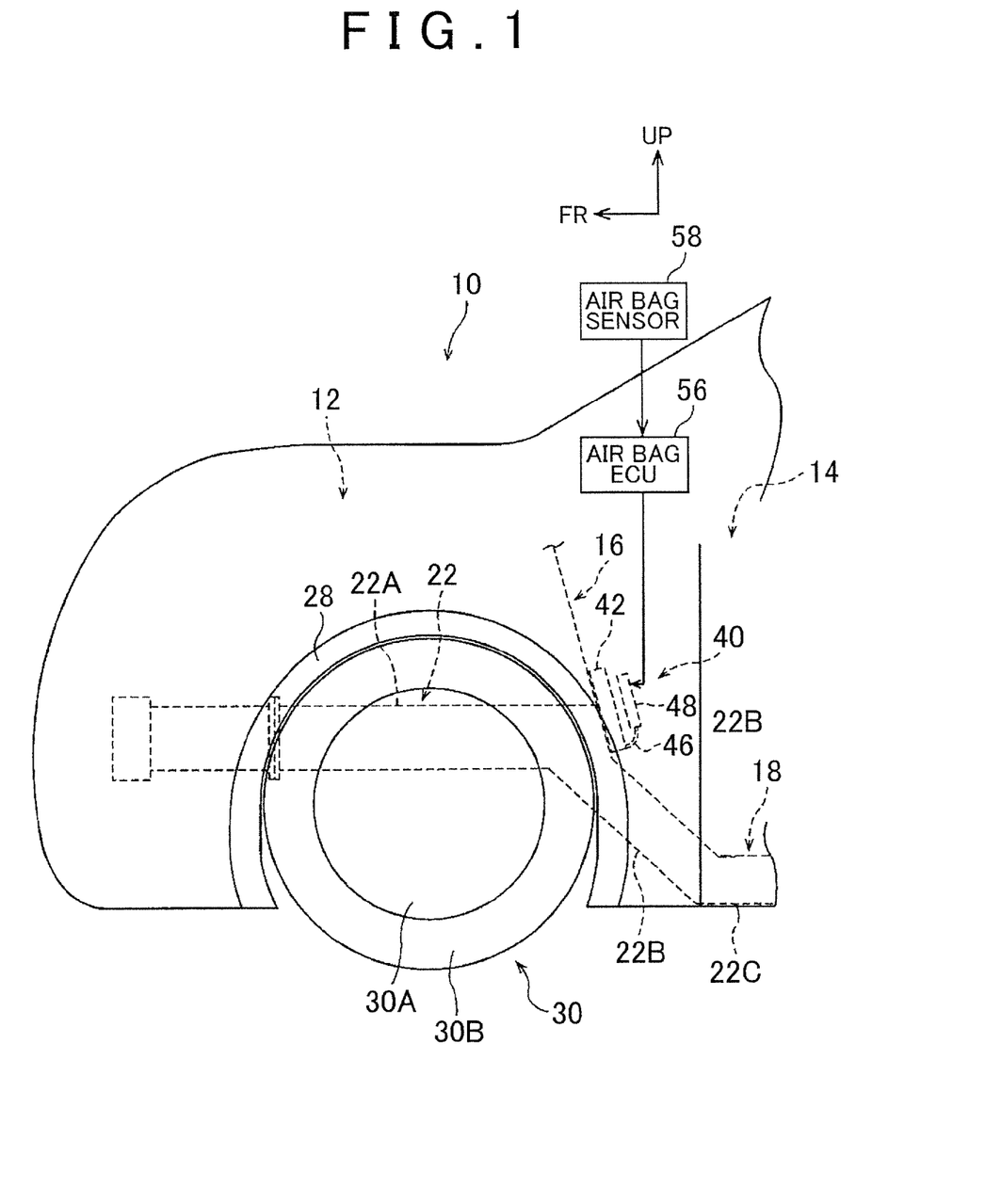
FIG. 1 is a side view illustrating a vehicle front structure according to a first embodiment of the present invention.
Figure 2:
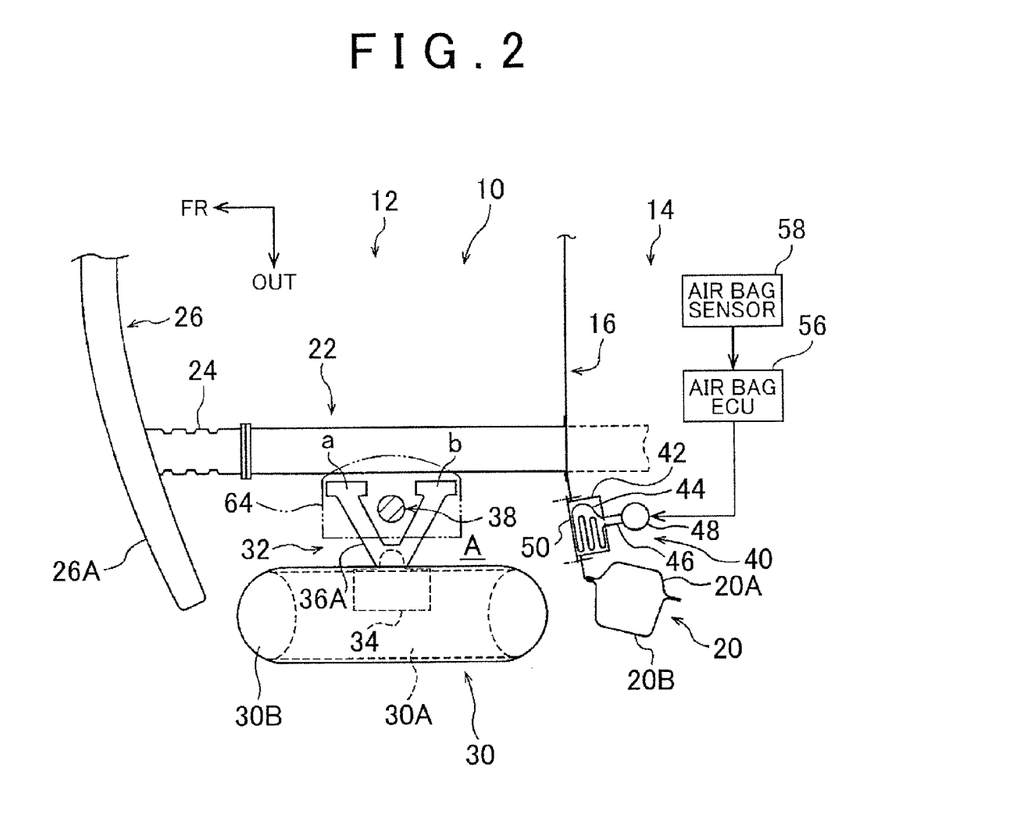
FIG. 2 is a schematic plan view illustrating a vehicle left-side part of the vehicle front structure of FIG. 1.

FIG. 1 is a side view illustrating a vehicle front structure 10 according to the present embodiment, and FIG. 2 is a schematic plan view illustrating a vehicle left-side part of the vehicle front structure 10. As illustrated in these figures, a vehicle-body front portion 12 is divided from a cabin 14 by a dash panel 16. An upper end of the dash panel 16 illustrated in FIG. 1 is connected to a bottom face of a cowl (not shown). Further, a lower end of the dash panel 16 is connected to a front end of a vehicle body floor 18. In both ends of the dash panel 16 in the vehicle width direction in FIG. 2, paired right and left front pillars 20 extending generally in a vehicle up and down direction are provided. The front pillars 20 are each formed in a hollow column shape by a pillar inner 20A and a pillar outer 20B.

Further, on both sides of the vehicle-body front portion 12, paired right and left front side members 22 extend along a vehicle front-rear direction. The front side member 22 is placed on an inner side relative to a front wheel 30 in the vehicle width direction. The front side member 22 has a rectangular closed section structure and is formed in an elongated shape. Further, as illustrated in FIG. 1, the front side member 22 includes an upper part 22A placed on a vehicle front side relative to the dash panel 16 in a side view of a vehicle, and the front side member 22 also includes a kick part 22B continuous with a rear end of the upper part 22A, and the front side member 22 includes a lower part 22C continuous with a rear end of the kick part 22B. The kick part 22B of the front side member 22 is inclined downward toward a vehicle rear side along a face shape of a lower portion side of the dash panel 16 from the rear end of the upper part 22A of the front side member 22, and the kick part 22B is placed on the inner side relative to the front pillar 20 in the vehicle width direction (see FIG. 2). Further, the lower part 22C of the front side member 22 extends toward the vehicle rear side along a bottom face of the vehicle body floor 18 from the rear end of the kick part 22B.

As illustrated in FIG. 2, a front end of each of the paired right and left front side members 22 is connected to a rear end of a crash box 24 functioning as an impact absorption member. Further, respective front ends of paired right and left crash boxes 24 are connected to each other via a front bumper reinforcement 26. The front bumper reinforcement 26 is a high-strength elongated member constituting part of a front bumper, and the front bumper reinforcement 26 is placed on a front end of the vehicle-body front portion 12 so as to be extended in the vehicle width direction. Both outer ends 26A of the front bumper reinforcement 26 in the vehicle width direction project toward an outer side relative to the front ends of the crash boxes 24 in the vehicle width direction.

Figure 5:
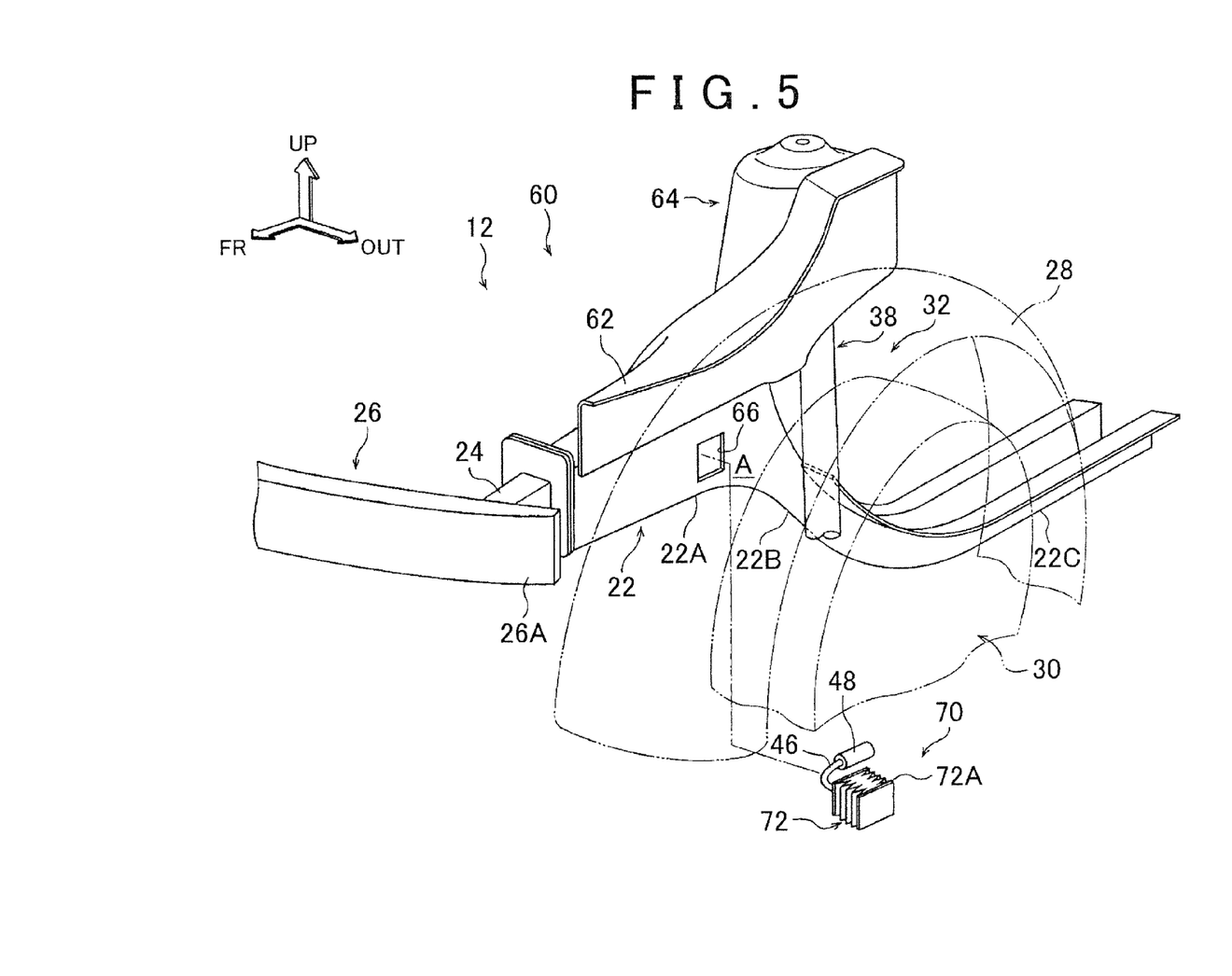
FIG. 5 is a schematic perspective view illustrating a vehicle left-side part of a vehicle front structure according to a second embodiment of the present invention.

Further, a suspension tower 64 having a generally tubular shape is formed in a range between the front side member 22 and the front wheel 30, the range including a vehicle upper side. See FIG. 5 of a second embodiment to be described later, because FIG. 5 is a perspective view illustrating part of the suspension tower 64.

As illustrated in FIG. 1, a wheel house 28 is placed on the vehicle upper side relative to the front wheel 30. The wheel house 28 covers an upper part of the front wheel 30 from the vehicle upper side, and curves along a circumferential direction of the front wheel 30.

Further, the front wheel 30 includes a wheel 30A having a circular plate portion perpendicular to a rotation axis, and a tire 30B held in an outer peripheral portion of the wheel 30A. As illustrated in FIG. 2, the front wheel 30 is placed on the vehicle front side relative to the front pillar 20. The front wheel 30 is connected to the vehicle-body front portion 12 by a suspension 32.

Figure 6:
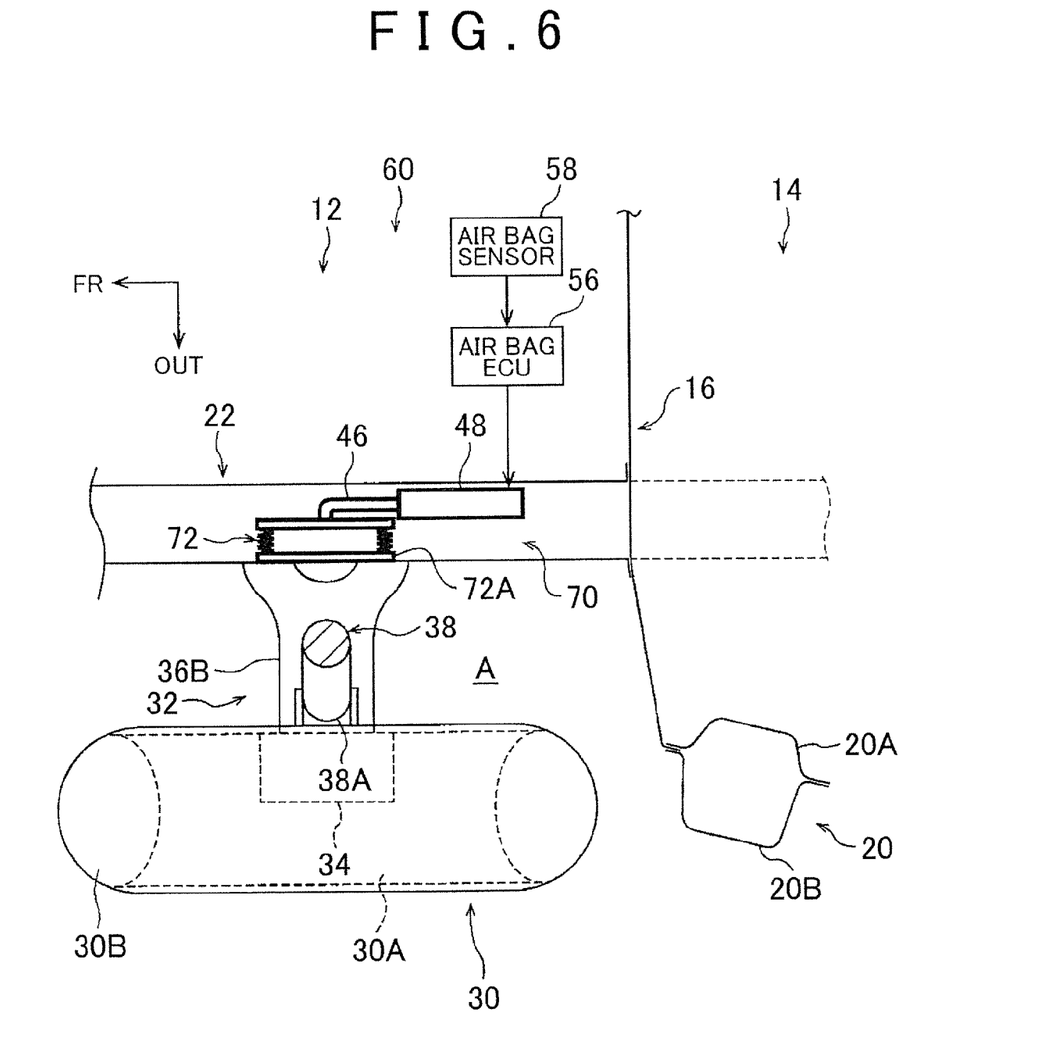
FIG. 6 is a schematic plan view partially illustrating the vehicle front structure of FIG. 5.

The suspension 32 is a device for damping vibration from the front wheel 30 to the vehicle-body front portion 12. The suspension 32 includes a wheel-assembly support member 34 for rotatably supporting the front wheel 30. Outer ends of suspension arms (a generally V-shaped upper arm 36A that is opened toward the inner side in the vehicle width direction in a plan view and a lower arm (not shown)) in the vehicle width direction are connected to the wheel-assembly support member 34. Note that, the lower arm of the suspension arms is not illustrated in the drawings of the present embodiment, but see FIG. 6 of the second embodiment to be described later, because a lower arm 36B is illustrated in FIG. 6.

Inner ends of the upper arm 36A in the vehicle width direction as illustrated in FIG. 2 are connected to an inner part of the suspension tower 64 swingably around an axis along the vehicle front-rear direction. Further, inner ends of the lower arm in the vehicle width direction are connected to the suspension member (not shown) fixed to the front side member 22, swingably around the axis along the vehicle front-rear direction. Note that the placement of the suspension arms varies depending on a type of the suspension.

A shock absorber 38 provided generally in the vehicle up and down direction is placed between the lower arm provided on a vehicle lower side of the upper arm 36A and a top of the suspension tower 64. The shock absorber 38 constitutes part of the suspension 32, and is placed between the front wheel 30 and the front side member 22. In the figure, a specific configuration of the shock absorber 38 is omitted.

Figure 3:
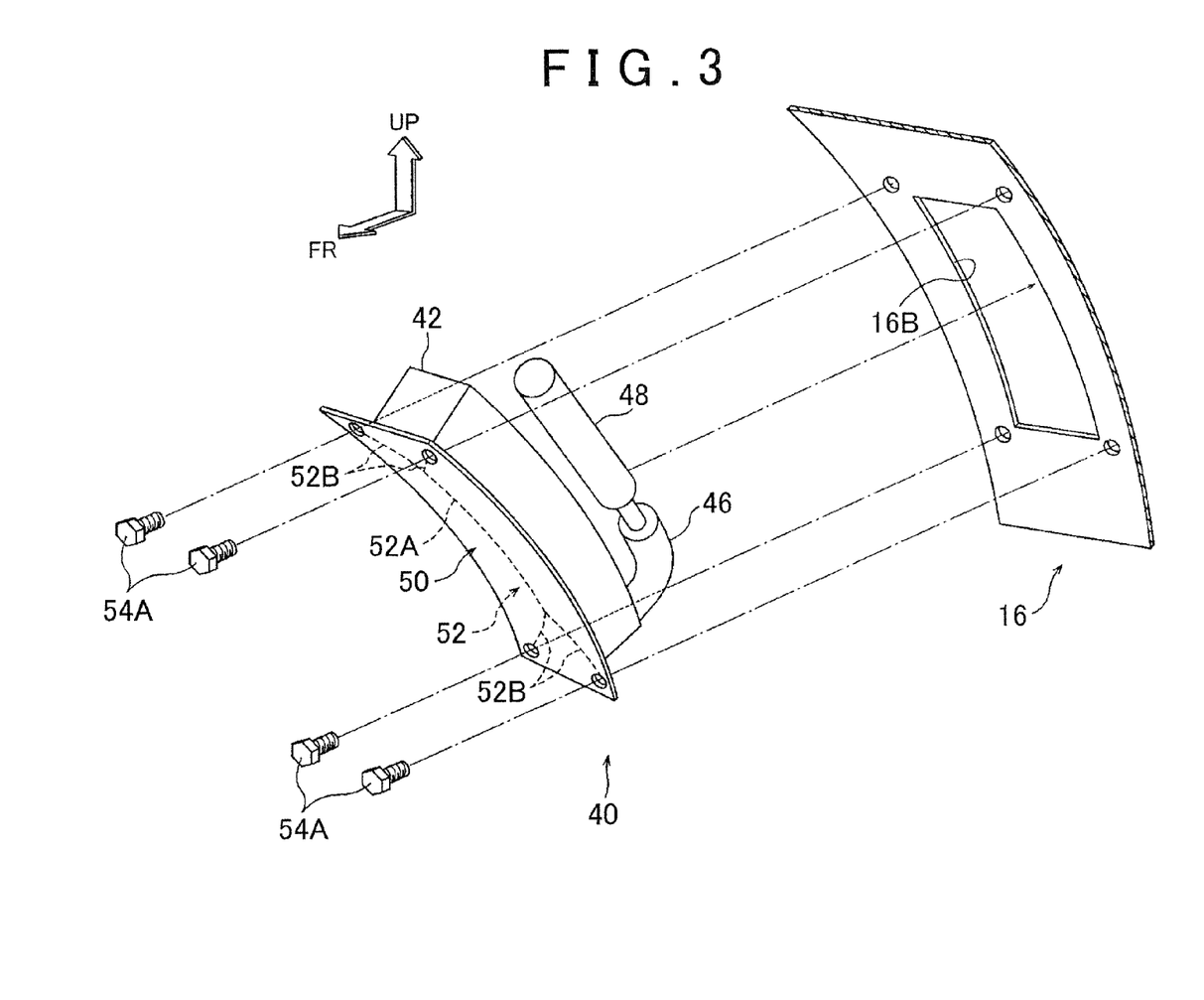
FIG. 3 is an exploded perspective view illustrating an air bag device of the vehicle front structure of FIG. 1 and its peripheral area.

An air bag device 40 is fixed to the dash panel 16 on the vehicle rear side relative to the shock absorber 38. FIG. 3 is a perspective view illustrating a state where part of the dash panel 16 and the air bag device 40 are illustrated in an exploded manner. As illustrated in FIG. 3, the air bag device 40 includes a metal case 42 formed generally in a box shape. An outer peripheral surface of an open end (an end on the left side in the figure) of the case 42 is placed adjacent to an inner circumference end surface of a rectangular opening 16B formed in the dash panel 16 in a penetrating manner.

As illustrated in FIG. 2, a cloth air bag 44 is stored inside the case 42 in a folding state. That is, the air bag 44 is provided in a part facing a space A between the front wheel 30 and the front side member 22. Note that FIG. 2 illustrates the air bag 44 in a state where the air bag 44 is seen through an upper wall portion of the case 42 (the same applies to FIG. 4).

The air bag 44 is connected to one end of a gas passage pipe 46. The gas passage pipe 46 penetrates through the case 42, and the other end thereof is connected to a gas injection portion of an inflator 48. The air bag 44 is placed so that, when gas flows into the air bag 44 from the inflator 48 via the gas passage pipe 46, the air bag 44 is expanded and deployed between the front wheel 30 and the front side member 22. An area where the air bag 44 is expanded and deployed is set between a rear part of the front wheel 30 and the front side member 22 as an example in the present embodiment.

As illustrated in FIG. 3, the inflator 48 is formed generally in a cylindrical shape, and the gas injection portion is formed on one axial end side thereof (a lower end side in FIG. 3), so that gas is injected from the gas injection portion at the time when the inflator 48 is activated. Note that the inflator 48 is formed generally in a cylindrical manner, but a so-called disc type inflator formed generally in a disc shape may be used. Further, the inflator 48 is such a type (gas-forming agent enclosed type) in which when the inflator 48 is filled with a gas-forming agent and a current is applied to an ignition device (not shown), the gas-forming agent burns to generate a large amount of gas. However, the inflator 48 is not limited to this, and such a type (high-pressure gas enclosed type) in which high-pressure gas is enclosed therein may be used. Further, there are an electric ignition type and a mechanical ignition type as an ignition type of the inflator 48, and either of them can be used. However, in the present embodiment, the electric ignition type is used as an example.

As illustrated in FIG. 1, an air bag ECU 56 is connected to the inflator 48, and an air bag sensor 58 for detecting a front end collision of the vehicle is connected to the air bag ECU 56. The air bag ECU 56 activates the inflator 48 when a front end collision of the vehicle is detected by the air bag sensor 58. As one example in the present embodiment, when a front end collision of the vehicle is detected by the air bag sensor 58, a predetermined current is applied to the ignition device according to a control by the air bag ECU 56.

As illustrated in FIG. 3, an opening side of the case 42 in the air bag device 40 is closed by an air bag door 50. Although not specifically illustrated herein, the air bag door 50 is locked by the case 42. Further, an outer peripheral end of the air bag door 50 projects toward outside an open end of the case 42, and four corners thereof are fixed to an outer peripheral portion of the opening 16B of the dash panel 16 by fastening with bolts 54A and weld nuts (not shown). Note that, in FIG. 2, the bolts and the like in a bolt fastening part are not illustrated, and a bolt fastening line is shown by an alternate long and short dash line (the same applies to FIG. 4). A vehicle front side surface of the air bag door 50 as illustrated in FIG. 2 is generally aligned with a vehicle front side surface of the dash panel 16, so as not to interfere with the front wheel 30 at the time of steering the vehicle.

As illustrated in FIG. 3, a tearing portion 52 is formed in the air bag door 50. The tearing portion 52 is provided as a thinned part such that part of that surface (a back surface) of the air bag door 50 which is close to the case 42 is recessed in a groove-like shape, and is set so that the tearing portion 52 is torn (split) when a bag inflation pressure which is a predetermined value or more is applied thereto. In the present embodiment, the tearing portion 52 includes a lengthwise tearing portion 52A, and diagonal tearing portions 52B. The lengthwise tearing portion 52A is formed in an intermediate part of the air bag door 50 in an up-down direction, and extends in the up-down direction along a centerline in a door width direction. The diagonal tearing portions 52B are branched off in a V-shape from upper and lower ends of the lengthwise tearing portion 52A, so as to extend toward corners of the air bag door 50.

(Operation/Effects) Operations and effects of the embodiment are described below.

Figure 4:
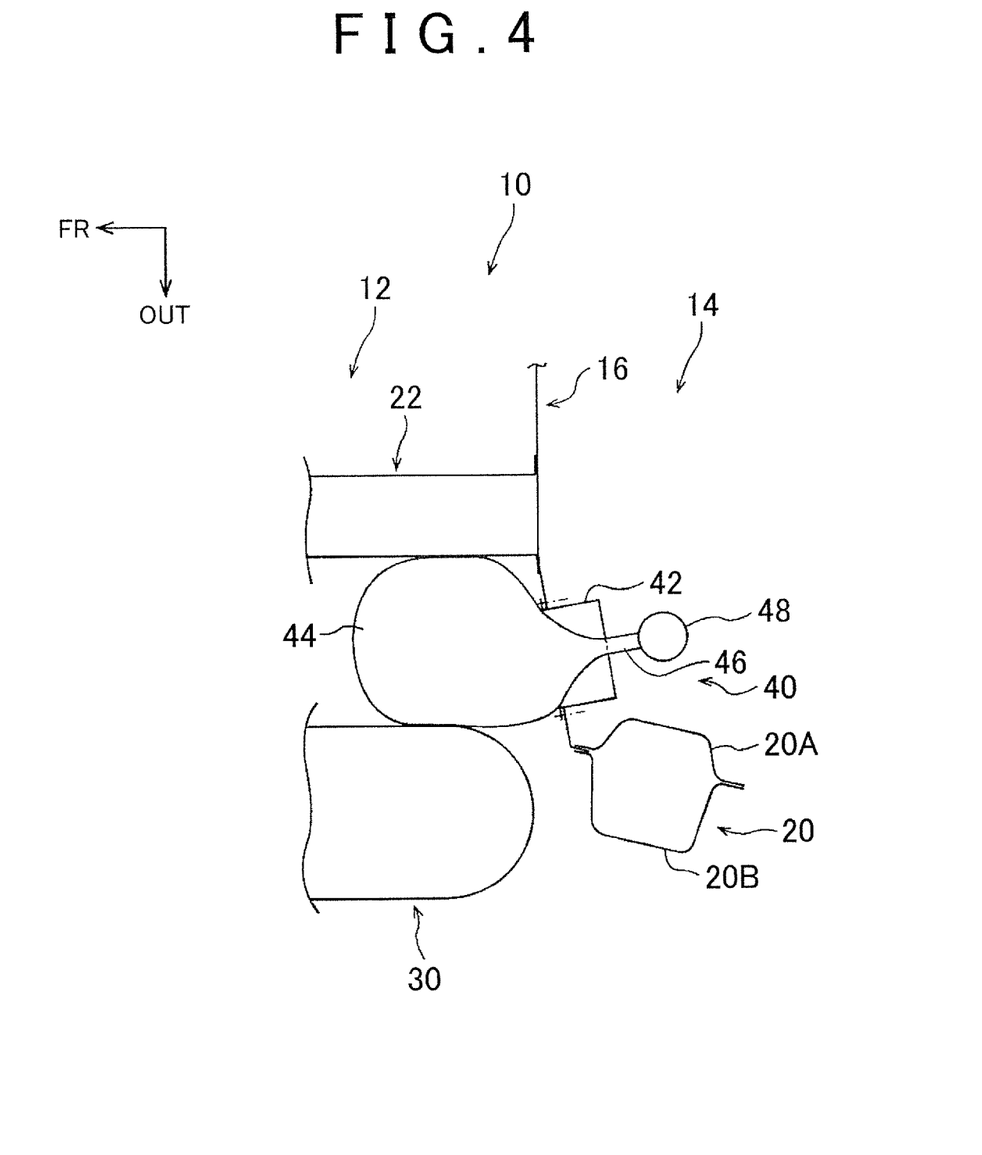
FIG. 4 is a schematic plan view illustrating a state where an air bag of FIG. 2 is expanded and deployed.

At the time of a short overlap collision in which a front end collision or oblique collision of a vehicle occurs in an outer side relative to the front side member 22 in the vehicle width direction in FIG. 2, a load can be applied to the front wheel 30 diagonally rearward toward the inner side in the vehicle width direction (in other words, toward the dash panel 16). In terms of this, the present embodiment is configured such that the air bag 44 of the air bag device 40 is provided in a part facing the space A between the front wheel 30 and the front side member 22, and when gas flows into the air bag 44, the air bag 44 is expanded and deployed between the front wheel 30 and the front side member 22. In view of this, at the time of a short overlap collision or an oblique collision, when the air bag 44 is expanded and deployed as illustrated in FIG. 4, even if the front wheel 30 is going to move diagonally rearward toward the inner side in the vehicle width direction due to a collision load, the front wheel 30 is supported by the air bag 44 that receives a reaction force from the front side member 22. Accordingly, the front wheel 30 is forcibly held and the movement of the front wheel 30 toward the inner side in the vehicle width direction is restrained.

As described above, according to the vehicle front structure 10 of the present embodiment, it is possible to restrain a movement stroke of the front wheel 30 when a load is applied to the front wheel 30 diagonally rearward toward the inner side in the vehicle width direction.

[Modification of First Embodiment] Next will be described a modification of the first embodiment of the present invention with reference to FIG. 2 of the first embodiment. The modification of the first embodiment has generally the same configuration as the first embodiment except that an air bag 44 is expanded and deployed toward an upper arm 36A. In view of this, a constituent generally the same as that of the first embodiment has the same reference sign of that of the first embodiment, and a description thereof is omitted appropriately.

As illustrated in FIG. 2, the upper arm 36A as a suspension arm constituting part of a suspension 32 is placed on the inner side relative to a front wheel 30 in the vehicle width direction and on the outer side relative to a front side member 22 in the vehicle width direction. Further, the air bag 44 of an air bag device 40 is placed on a vehicle rear side relative to the upper arm 36A. The air bag 44 is placed so that, when gas flows into the air bag 44, the air bag 44 is expanded and deployed toward the upper arm 36A and is also expanded and deployed between the front wheel 30 and the front side member 22.

According to a configuration of the modification, it is possible to obtain the same operations and effects as the first embodiment, and further, at the time of a short overlap collision or an oblique collision, the upper arm 36A can be supported from the vehicle rear side, thereby making it possible to more effectively restrain a movement stroke of the front wheel 30 toward the inner side in the vehicle width direction. The following describes this point.

When a collision load is input into the front wheel 30 at the time of a short overlap collision or an oblique collision, and either one of connection portions a, b of the upper arm 36A with respect to the suspension tower 64 is detached, for example, the upper arm 36A is going to rotate around the other one of the connection portions a, b. In such a short overlap collision or an oblique collision, when the air bag 44 is expanded and deployed, even if the upper arm 36A is going to rotate as described above, the upper arm 36A is supported by the air bag 44 that receives a reaction force from the front side member 22. This accordingly restrains a rotational movement of the upper arm 36A, thereby restraining a movement of the front wheel 30 toward the inner side in the vehicle width direction.

Note that, as another modification, the air bag 44 may be configured such that, when gas flows into the air bag 44, the air bag 44 is expanded and deployed toward a lower arm 36B (see FIG. 6 of the second embodiment to be described later) as the suspension arm (constituting part of the suspension 32), and the air bag 44 is also expanded and deployed between the front wheel 30 and the front side member 22.

[Second Embodiment] Next will be described a vehicle front structure 60 according to the second embodiment of the present invention with reference to FIGS. 5 to 7. Note that the same constituent as that of the first embodiment has the same reference sign as that of the first embodiment, and a description thereof is omitted.

FIG. 5 is a schematic perspective view illustrating a vehicle left-side part of the vehicle front structure 60 according to the second embodiment of the present invention. As illustrated in FIG. 5, an apron upper member 62 is disposed on an outer side of a front side member 22 in the vehicle width direction and on a vehicle upper side thereof. A suspension tower 64 is provided on an inner side of the apron upper member 62 in the vehicle width direction. An upper part of a shock absorber 38 is placed inside the suspension tower 64. An intermediate part of the shock absorber 38 in an up-down direction thereof is placed between an upper part of a front wheel 30 and the front side member 22.

FIG. 6 is a schematic plan view illustrating part of the vehicle front structure 60. Note that, in FIG. 6, an upper arm of suspension arms is not illustrated (the same applies to FIG. 7), and an inner part of the front side member 22 is seen through an upper wall portion thereof (the same applied to FIG. 7). As illustrated in FIG. 6, a lower end 38A of the shock absorber 38 is connected to the lower arm 36B swingably around an axis thereof along the vehicle front-rear direction.

An air bag device 70 is fixed to the inner part of the front side member 22 on the inner side relative to the shock absorber 38 in the vehicle width direction. The air bag device 70 includes a gas passage pipe 46 and an inflator 48 similarly to the air bag device 40 in the first embodiment illustrated in FIG. 3, etc. Further, as illustrated in FIGS. 5 and 6, the air bag device 70 includes a metal air bag 72 connected to one end of the gas passage pipe 46. The inflator 48 is fixed to the front side member 22.

The air bag 72 is provided inside the front side member 22 in a state where the air bag 72 is folded in a bellows manner with the vehicle width direction being taken as a deployment direction. That is, the air bag 72 is provided in a part facing a space A between the front wheel 30 and the front side member 22. Note that FIG. 5 illustrates a state where the air bag 72 is slightly expanded so as to clearly illustrate a shape of the air bag 72.

As illustrated in FIG. 5, an opening 66 is formed in a penetrating manner in an opposed part to the shock absorber 38, in a longitudinal wall portion of an outer side of the front side member 22 in the vehicle width direction. An outer end 72A of the air bag 72 in the vehicle width direction is placed in the opening 66 of the front side member 22. The air bag 72 illustrated in FIG. 6 is placed so that, when gas flows into the air bag 72 from the inflator 48 via the gas passage pipe 46, the air bag 72 is expanded and deployed between the front wheel 30 and the front side member 22, more particularly, between the shock absorber 38 and the front side member 22.

(Operations and Effects) Operations and effects of the embodiment are described below.

Figure 7:
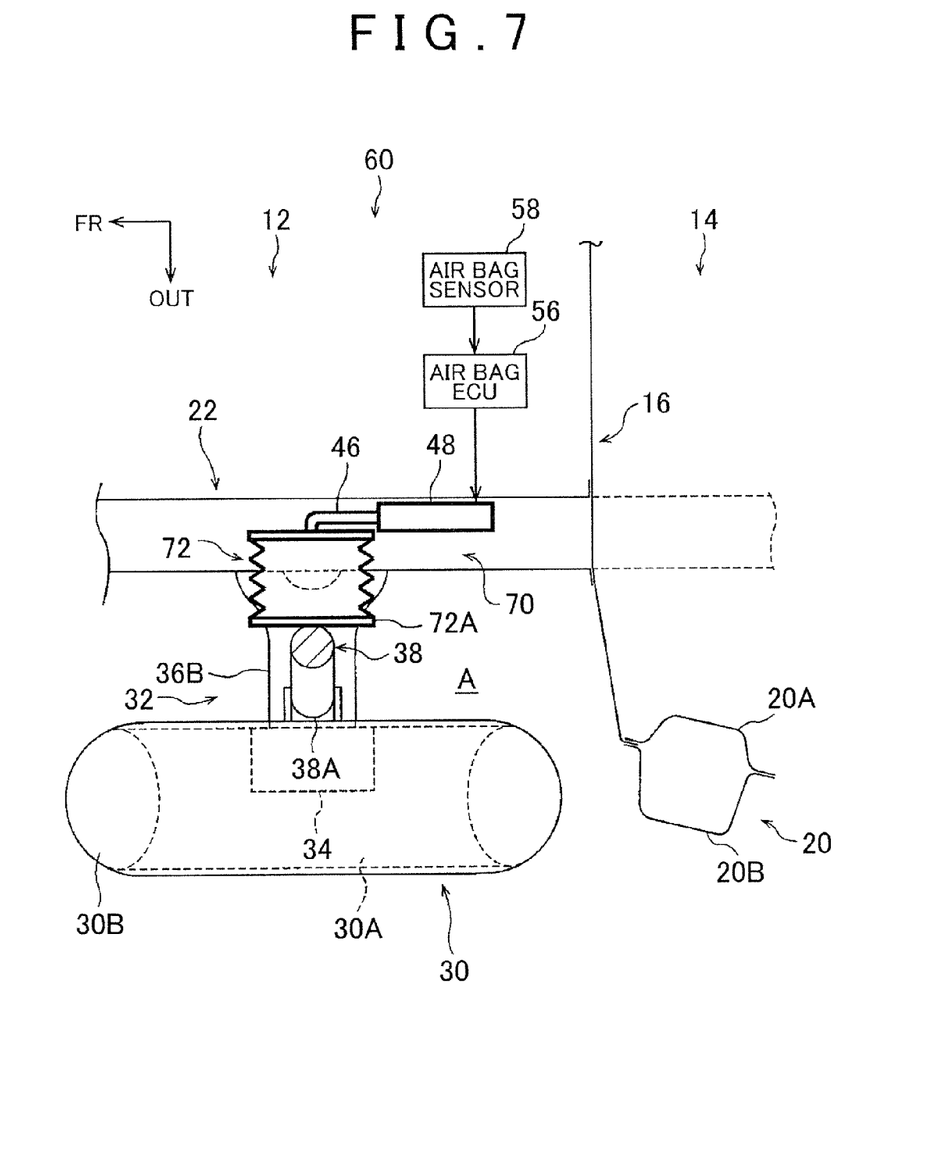
FIG. 7 is a schematic plan view illustrating a state where an air bag of FIG. 6 is expanded and deployed.

In the present embodiment, at the time of a short overlap collision or an oblique collision, when the air bag 72 is expanded and deployed as illustrated in FIG. 7, even if the shock absorber 38 and the front wheel 30 are going to move diagonally rearward toward the inner side in the vehicle width direction due to a collision load, the shock absorber 38 is supported by the air bag 72 that receives a reaction force from the front side member 22. Accordingly, the shock absorber 38 and the front wheel 30 are forcibly held and the movement of the shock absorber 38 and the front wheel 30 toward the inner side in the vehicle width direction is restrained.

Further, in the present embodiment, the air bag 72 is provided in the front side member 22. Hereby, it is possible to easily cause the air bag 72 to intervene between the front wheel 30 and the front side member 22 in a short time.

Further, in the present embodiment, an area where the air bag 72 is expanded and deployed is set between the shock absorber 38 and the front side member 22. Accordingly, a distance between a counter member (the shock absorber 38 in the present embodiment) that applies a collision load to the air bag 72 and the front side member 22 can be shortened in comparison with a case of the first embodiment. Hereby, even if an amount of expansion of the air bag 72 toward the outer side in the vehicle width direction is small, the air bag 72 holds the shock absorber 38, so that the movement of the shock absorber 38 and the front wheel 30 can be restrained effectively. In other words, in comparison with a case where the area where the air bag is expanded and deployed is set between the front wheel 30 and the front side member 22, it is possible for the air bag 72 to restrain the movement of the front wheel 30 more quickly. Further, a variation in a distance between the shock absorber 38 and the front side member 22 due to steering of the vehicle is small in comparison with a distance between the rear part of the front wheel 30 and the front side member 22, for example. Accordingly, in the present embodiment, the movement of the front wheel 30 can be restrained more stably.

As described above, according to the vehicle front structure 60 of the present embodiment, when a load is applied to the front wheel 30 diagonally rearward toward the inner side in the vehicle width direction, it is possible to restrain a movement stroke of the front wheel 30.

[Supplementary Description of Embodiments] Note that, as a modification of the above embodiments, the air bag may be placed in the wheel house and configured such that, when gas flows into the air bag, the air bag is expanded and deployed between the front wheel and the front side member.

Further, as a modification of the above embodiments, the inflator 48 may be placed in an available space different from the cases of the first, second embodiments illustrated in FIGS. 2, 6, etc., and the inflator 48 may be connected to the air bag 44, 72 via the gas passage pipe 46.

Further, in addition to the configurations of the above embodiments, a pre-crash sensor that predicts a front end collision with a collision object by a millimeter wave radar or the like, for example, may be disposed in a front bumper, and the pre-crash sensor may be connected to the air bag ECU 56. That is, either in a case where a front end collision is predicted by the pre-crash sensor, or in a case where a front end collision of the vehicle is detected by the air bag sensor 58, the air bag ECU 56 may activate the inflator 48.

Further, the vehicle front portion may be provided with, for example, a first detecting section for detecting a short overlap collision among front end collisions of the vehicle, and a second detecting section for detecting a diagonal collision among the front end collisions of the vehicle, and the first detecting section and the second detecting section may be connected to the air bag ECU 56. Then, either in a case where a short overlap collision is detected by the first detecting section or in a case where a diagonal collision is detected by the second detecting section, the air bag ECU 56 may activate the inflator 48.

Further, in each of the above embodiments, the front wheel 30 is configured to be maintained in an original position by the actuation of the air bag 44, 72. However, as a modification, the front wheel 30 may be pushed toward the outer side in the vehicle width direction by the actuation of the air bag 44, 72.

Further, as a modification of the first embodiment, the air bag 44 illustrated in FIG. 2, etc., may be configured such that, when gas flows into the air bag 44, the air bag 44 is expanded and deployed between the front wheel 30 and the front side member 22, more particularly, between the shock absorber 38 and the front side member 22, for example. In this case, when the air bag 44 is expanded and deployed at the time of a short overlap collision or an oblique collision, even if the shock absorber 38 and the front wheel 30 are going to move diagonally rearward toward the inner side in the vehicle width direction due to a collision load, the shock absorber 38 is supported by the air bag 44 that receives a reaction force from the front side member 22. That is, it is possible to more effectively restrain the movement stroke of the front wheel 30 toward the inner side in the vehicle width direction by holding the shock absorber 38 from the inner side in the vehicle width direction. Further, as a modification of the second embodiment, the air bag 72 illustrated in FIG. 6 may be placed in a position that causes the air bag 72 to be expanded and deployed between the rear part of the front wheel 30 and the front side member 22 when gas flows into the air bag 72.

Further, as a modification of the first embodiment, instead of the air bag 44 illustrated in FIG. 2, etc., the air bag 72 (see FIG. 6, etc.) in the second embodiment may be applied to the air bag device. Further, as a modification of the second embodiment, instead of the air bag 72 illustrated in FIG. 6, etc., the air bag 44 (see FIG. 2, etc.) in the first embodiment may be applied to the air bag device. Further, as a modification of the second embodiment, the air bag device 70 may be placed on a bottom face of the front side member 22.

Further, a vehicle right-side part of the vehicle front portion may be provided with an air bag device similar to the air bag devices 40, 70 in the first, second embodiments, in a similar positional relationship (a positional relationship in a symmetrical manner to FIG. 2, 6 about a center line of the vehicle front portion in the vehicle width direction). In other words, the vehicle front portion may be configured such that the air bag device corresponding to the air bag devices 40, 70 in the first, second embodiments is placed on one side thereof in the vehicle width direction or on both sides thereof in the vehicle width direction.

Furthermore, the "suspension arm" includes the upper arm 36A and the lower arm 36B in the above embodiments, and other suspension arms such as a link in a multilink suspension, for example.

Note that the above embodiments and the plurality of modifications described above can be combined appropriately to perform the present invention.

Embodiments of the present invention have been described above, but the present invention is not limited to the above and may be modified in various ways to be performed, as long as the modifications are not beyond the gist thereof.

What is claimed is:

1. A vehicle front structure comprising:
a front side member provided in a side part of a vehicle-body front portion, the front side member extending along a vehicle front-rear direction, the front side member being placed on an inner side relative to a front wheel in a vehicle width direction; and
an air bag device including an air bag provided in a part directly facing a space between the front wheel and the front side member, the air bag being expanded and deployed to enter the space between the front wheel and the front side member, when gas flows into the air bag, to restrain movement of the front wheel towards the inner side in the vehicle width direction,
wherein the air bag is provided in a dash panel, the dash panel dividing the vehicle-body front portion from a cabin.

2. The vehicle front structure according to claim 1, wherein:
a suspension arm is placed on the inner side relative to the front wheel in the vehicle width direction and on an outer side relative to the front side member in the vehicle width direction, the suspension arm being part of a suspension; and
the air bag is provided on a vehicle rear side relative to the suspension arm, the air bag being expanded and deployed toward the suspension arm when gas flows in the air bag.

3. A vehicle front structure comprising:
a front side member provided in a side part of a vehicle-body front portion, the front side member extending along a vehicle front-rear direction, the front side member being placed on an inner side relative to a front wheel in a vehicle width direction; and
an air bag device including an air bag provided in a part facing a space between the front wheel and the front side member, the air bag being expanded and deployed between the front wheel and the front side member, when gas flows into the air bag, to contact an inner surface of the front wheel, in the vehicle width direction, and an outer surface of the front side member, in the vehicle width direction.

4. The vehicle front structure according to claim 3, wherein:
the air bag is provided in a dash panel, the dash panel dividing the vehicle-body front portion from a cabin.

5. The vehicle front structure according to claim 3, wherein:

a suspension arm is placed on the inner side relative to the front wheel in the vehicle width direction and on an outer side relative to the front side member in the vehicle width direction, the suspension arm being part of a suspension; and the air bag is provided on a vehicle rear side relative to the suspension arm, the air bag being expanded and deployed toward the suspension arm when gas flows in the air bag.

* * * * *